Jan. 31, 1928. 1,657,632
J. MARCUS
MACHINE FOR TRIMMING THE SOLES OF BOOTS AND SHOES
Filed Nov. 5, 1925
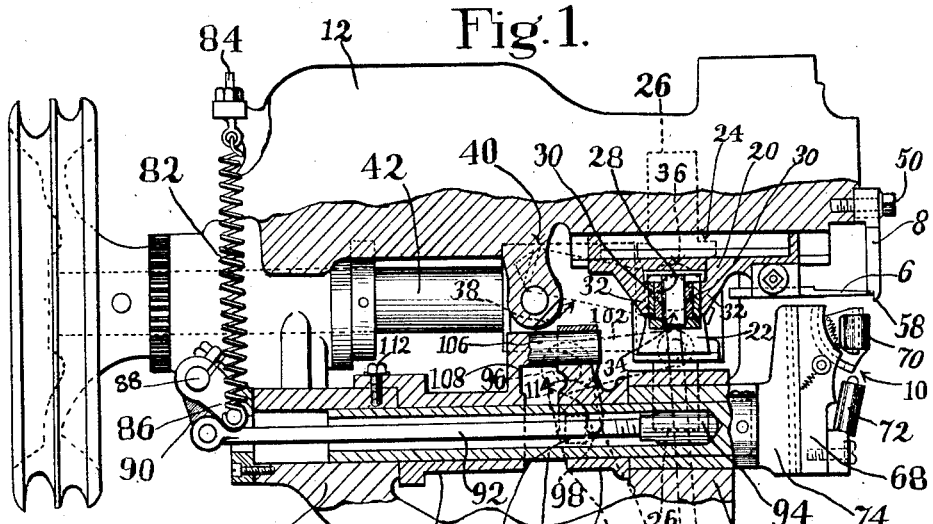
Fig. 1.
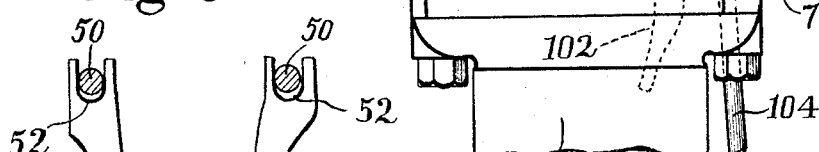
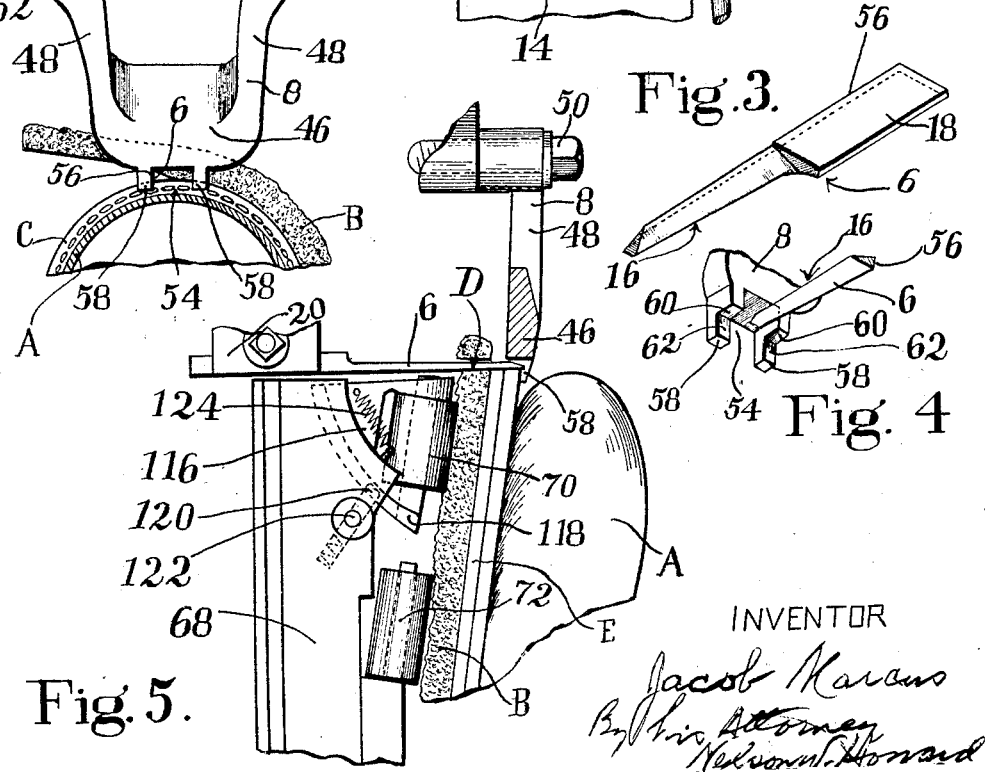
INVENTOR
Jacob Marcus
By his Attorney
Nelson T. Howard Patented Jan. 31, 1928.

1,657,632

UNITED STATES PATENT OFFICE.

JACOB MARCUS, OF HOLLAND, MICHIGAN, ASSIGNOR TO UNITED SHOE MACHINERY CORPORATION, OF PATERSON, NEW JERSEY, A CORPORATION OF NEW JERSEY.

MACHINE FOR TRIMMING THE SOLES OF BOOTS AND SHOES.

Application filed November 5, 1925. Serial No. 67,046.

This invention relates to machines for trimming the soles of boots and shoes and is herein illustrated as embodied in a machine for trimming soles of crepe rubber although in certain aspects the invention is not necessarily limited to machines for operating upon this particular class of work.

Trimming operations upon the soles of boots and shoes are usually performed by a so-called rounding or rounding and channeling machine and such machines are usually fitted with a reciprocating trimming knife which is arranged to cut with a chopping action against a cutting block and which is particularly adapted for trimming leather soles.

One object of the present invention is to improve the construction of machines of this type for the purpose of better adapting them for operation upon shoes having soles made of crepe rubber or like material, and particularly for operation upon shoes the bottoms of which comprise an untrimmed crepe sole and another part, such as a leather welt the outer edge of which has previously been trimmed or finished to final shape.

With the above object in view, one feature of the invention consists in the provision, in a machine of the class described, of a reciprocating trimming knife, and means for engaging the edge of a portion of a shoe bottom previously shaped substantially to final marginal contour to locate relatively to the knife a portion of the shoe bottom to be trimmed and for rigidly supporting the shoe bottom against the thrust of the knife. The illustrated machine is particularly designed to operate upon shoe bottoms comprising a leather welt and a two-ply sole consisting of first and second units or layers of crepe rubber, the welt and the first sole unit being trimmed substantially to final shape before the second sole unit is applied to the shoe. As shown, the machine is provided with a trimming knife having a lateral cutting edge extending in the general direction of movement of the knife, so that the knife will cut with a draw stroke as distinguished from a chopping stroke, and the work guide or edge gage is provided with guiding faces for engaging the trimmed or previously shaped edge of a leather welt to guide the work as it is fed past the knife, and with bearing surfaces for engaging the outer or exposed face of the welt to support the sole margin against the thrust of the knife.

To insure proper trimming of soles by means of a reciprocating trimming knife adapted to cut as above described, it is desirable to arrange and operate the knife so that it will extend entirely through the sole with the tip or free extremity of the knife projecting beyond the sole at all times. To facilitate the operation of such a knife the illustrated edge gage, in accordance with another feature of the present invention, is notched or recessed between the faces which engage the edge of the welt or other trimmed portion of the shoe bottom to receive the projecting tip of the knife. By means of this construction the edge gage is adapted properly to guide and support the work without interfering with the stroke of the knife and further a bearing is provided for the back of the knife so that the knife is supported against the thrust of the work being fed against it.

After a shoe having a crepe sole has been worn for a while it often happens that the sole margin becomes distorted so that the edge faces flare outwardly from the upper to an objectionable degree. In order to avoid such a condition, provision is made, in accordance with another feature of the present invention, for relatively positioning the trimming knife and the sole supporting means so that the knife will trim the sole margin at an angle so as to produce a beveled face slanting inwardly from the welt to the tread face of the sole. As shown, this result is attained by mounting a sole positioning and supporting roll at an angle to the perpendicular substantially equal to the angle of bevel desired to be imparted to the sole edge so that the roll will function as a gage accurately to position the sole to predetermine the angle of bevel of the trimming cut. Preferably, and as illustrated, the roll is arranged to engage the central portion of the tread face of the sole and a second roll is located so as to engage the sole nearer its edge and is mounted for tilting adjustment so as to accommodate itself to the plane of the sole. This second roll is shown as being acted upon by a spring tending to maintain it with its axis perpendicular to the path of the trimming knife so that it may serve also as a gage to position a sole for the making of a trimming cut which is at right angles to the tread face of the sole.

The invention will best be understood from a description of a preferred embodiment thereof illustrated in the accompanying drawings, in which:—

Fig. 1 is a view partially in side elevation and partially in section of a sole rounding machine in which the present invention is embodied;

Fig. 2 is a front elevational view of the work guide showing also the trimming knife in operative relation to the guide and a portion of a shoe the sole of which is being trimmed by the knife;

Fig. 3 is a perspective view of the trimming knife;

Fig. 4 is a perspective view of the lower or work-engaging portion of the work guide showing also a portion of the trimming knife; and Fig. 5 is a fragmentary view, partially in side elevation and partially in section, of the operative parts of the machine illustrating particularly the manner in which a shoe is positioned and supported for the trimming of the sole at a bevel.

In the drawings the invention has been shown as embodied in a sole rounding machine of the type disclosed in United States Letters Patent No. 1,030,606, granted June 25, 1912, in the name of F. H. Perry. The illustrated machine is provided with a trimming knife 6, a work guide and support 8, and a back rest or sole support 10, these parts being mounted upon a head 12 supported upon a pedestal 14.

As best shown in Fig. 3, the trimming knife 6 comprises an elongated blade ground at one side to form a lateral cutting edge 16 somewhat inclined with respect to the longitudinal axis of the knife so that as the knife is reciprocated longitudinally and the work is fed against it, there will be a slight advance of the cutting edge in the direction of feed at each cutting stroke. The knife 6 is formed with a shank portion 18 which is secured in a knife-carrying slide 20 (Fig. 1) and the slide 20 is reciprocated through an oscillating yoke 22 provided with a horizontal arm 24 connected with the slide 20 and also provided with vertical trunnions 26 mounted in bearings in the head 12. The arm 24 carries a roll 28 which is engaged by bearing blocks 30 arranged between transverse ribs 32 on the under side of the knife slide 20. A horizontal shaft 34 is journaled in the yoke 22 and an arm 36 is secured upon the shaft 34 and is provided with a cylindrical part 38 which extends at right angles to the shaft 34. This cylindrical part of the arm 36 fits within an inclined bearing 40 formed within the enlarged extremity of the main cam shaft 42 of the machine. The means just described for reciprocating the trimming knife is similar in construction and mode of operation to corresponding means disclosed in the above-mentioned Letters Patent No. 1,030,606, to which reference may be had for further description and illustration thereof. In order to facilitate the operation of the lateral edged knife, it is preferred, in the illustrated machine, to drive the cam shaft at a higher speed than in the machine of the Perry patent so that the trimming knife will be reciprocated more rapidly, and to make the bearing 40 in the cam shaft inclined somewhat less with respect to the axis of the shaft than is the corresponding bearing shown in the Perry patent, so as to shorten the stroke of the trimming knife.

The work guide and support 8, as best shown in Fig. 2, is bail shaped and comprises a work-engaging portion 46 formed at the lower extremities of two vertical arms 48 which are rigidly secured to the head 12 by means of screws 50 extending through vertical slots 52 in the upper ends of the arms 48. The work support and guide 8 is adapted to support the sole against the endwise thrust of the trimming knife and to gage the location of the work relatively to the knife by engagement with the edge of the welt or other previously trimmed portion of the shoe bottom. The work-engaging lower portion of the work guide is further so constructed as to avoid interference with the end of the trimming knife which projects beyond the sole and overlaps the welt and to provide a bearing for the back of the knife to support the knife against lateral thrust caused by feeding of the work against the knife. As shown, the work guide 8 is recessed or notched at 54 to receive the end of the trimming knife and the back or rear edge 56 of the knife is arranged to bear against a portion of the work guide at one side of the notch 54. The notch 54 is made deep enough to permit up-and-down adjustment of the work guide relatively to the knife for the purpose of accurately determining or varying the relation of the trimmed edge of the sole to the previously trimmed edge of the welt. The projections 58, which are formed at opposite sides of the notch 54, are cut away to form shoulders 60 and 62 on each projection. These shoulders 60 and 62 are offset from the path of the knife in the line of feed and are arranged to engage the work both in advance of and beyond the point of operation of the trimming knife, the shoulders 60 being arranged to engage the edge, and the shoulders 62 the outer or exposed face of the welt. The shoulders 62 therefore serve to support the sole margin against the end thrust of the knife in one direction while the back rest 10 receives the end thrust of the knife in the other direction. The slots 52 in the arms of the work guide permit vertical adjustment of the guide to enable the knife to cut in accurate alinement with the previously trimmed portion of the shoe bottom. These slots 52 also enable the work guide to be adjusted vertically relatively to the knife so that the trimming cut may be made to extend across the first unit or layer of the crepe sole and across the welt as well as across the second or outer unit of the sole. The last mentioned adjustment is advantageous when the sole is to be trimmed at a bevel to cause the first or inner sole layer and the welt to be beveled also so that their edges will be flush with the edge of the outer sole layer. A plurality of work guides having welt edge engaging shoulders of different widths may be interchangeably employed to accommodate welts of different thicknesses.

The sole rest or back support 10 comprises a slide 68 carrying upper and lower sole engaging rolls 70 and 72. The slide 68 is mounted for vertical adjustment in a support 74 rigidly secured to the front extremity of a hollow shaft 76 which is mounted to slide lengthwise in bearings 78 in the head 12. A sleeve 80 is secured upon the shaft 76 and is arranged to engage one end of the front bearing 78 to limit the forward movement of the shaft 76 and consequently of the back rest or sole support. The back rest 10 is pressed forwardly to maintain it in yielding engagement with the tread surface of the sole by a spring 82, the upper end of which is secured to an adjustable bolt 84 carried by the head 12 and the lower end of which is connected to an arm 86 secured to a rock shaft 88. A second arm 90 is secured to the rock shaft 88 and is connected with a rod 92 the front end of which carries a head 94 engaging the end of the bore in the hollow shaft 76. The back rest may be moved rearwardly in introducing or removing the work through a rock shaft 96 one end of which carries an arm 98 engaging a lug 100 on the sleeve 80. A bell crank lever 102 is secured to the rock shaft 96 and one end of the lever 102 extends into position to be conveniently operated by the hand of the operator and the other arm is connected by a rod 104 with an operating treadle (not shown). The mounting of the back rest, so far as it has been described, and the manner in which the back rest may be retracted from work-engaging position is substantially the same as that disclosed in the aforementioned Perry patent. In the machine of the Perry patent, however, the back rest carries a channeling knife and is vibrated back and forth in the line of feed for the purpose of facilitating the operation of the knife, but in the machine herein illustrated no channeling knife is employed and it is not desirable to vibrate the back rest. Accordingly the back rest is held against vibration by means of a horizontal stud 106 projecting from an arm 108 formed at one end of a sleeve 110 which surrounds the shaft 76 and is rigidly secured by a screw 112 to the rear bearing 78, the stud 106 being slidingly received within a socketed arm 114 projecting from the sleeve 80.

The rollers 70 and 72 which are carried by the back rest slide 68 are so arranged that their axes will extend at right angles to the edge of that portion of a sole which is being acted upon by the trimming knife so that the rollers will turn freely as the shoe is fed. The upper roller 70 is mounted to rock relatively to the slide 68 so that it will tilt to accommodate itself to variations in the transverse curvature of the sole and also to permit the sole to be inclined bodily with respect to the trimming knife for the purpose of producing a bevel at the trimmed edge of the sole. The lower roller 72 is permanently positioned with its axis disposed at an acute angle to the path of any given point in the trimming knife so that it will position a sole to insure that its margin will be beveled by the knife. As shown in Fig. 5, the upper roller 70 is mounted in a block 116 having segmental ribs, one of which is shown at 118, engaging curved guiding slots formed in the slide 68. The block 116 is retained in the slide 68 and the rocking movement of the block is limited by means of a spring-pressed pin 120 carried by the slide 68 and projecting into a slot in the block 116. The above described mode of mounting the block 116 for rocking movement in the slide 68 and the means for retaining the block in place and for limiting the extent of its rocking movement are substantially the same as corresponding means described in the aforesaid Perry patent in connection with the channel knife block, and a transverse pin 122 may be employed in the illustrated machine for engaging the pin 120 in a manner similar to that described in said patent for use in withdrawing the pin 120 to permit the removal of the block 116 from the slide 68. In the illustrated machine, as distinguished from the construction disclosed in said patent, the rocking block 116 is acted upon by a spring 124, connected at one end to the block 116 and at its opposite end to the slide 68, the spring tending to hold the roller 70 with its axis in a vertical position but permitting the block 116 to rock so that the roller 70 may tilt to accommodate itself to the position of the sole.

In order to avoid undesirable flaring of the edges of crepe soles, such as often occurs after such soles have been worn a certain length of time, provision has been made for trimming the sole at a bevel. This may be accomplished in the illustrated machine by tilting the shoe A so that the sole B will be inclined relatively to the knife 6 and the work guide 8, as shown in Fig. 5. For the purpose of determining the proper angle of bevel to be imparted to the edge of the sole, the lower roller 72 is mounted beneath the roller 70 in position to be engaged by the tread face of the sole and with its axis inclined to the vertical at an angle substantially equal to the angle of bevel desired. When a shoe is tilted as above described the upper roller 70 will readily tilt with the sole of the shoe until the axis of the upper roller is brought into alignment with the axis of the lower roller, as shown in Fig. 5. When, however, there is no work present in the machine the spring 124 will function to hold the upper roller 70 with its axis vertical in which position this roller serves as a gage to position a sole so that the trimming knife will trim the edge at right angles to the face of the sole.

In using the machine the back rest 10 is retracted and the shoe is positioned with the welt C projecting into the notches 62 in the edge gage 8, the edge of the welt bearing against the shoulders 60 and the outer face of the welt bearing against the shoulders 62. The back rest is then released and the roller 70 yieldingly engages the tread face of the sole. The edge of the welt will then be definitely located relatively to the trimming knife 6 (ordinarily with the edge of the welt in horizontal alinement with the cutting edge of the knife) and the margin of the crepe sole B will project upwardly beyond the path of the knife. If it is desired to trim the edge of the sole at right angles to the face of the sole the shoe will be held with the sole substantially vertical but if it is desired to produce a beveled edge the shoe is tilted until it engages the lower roller 72, the upper roller 70 rocking backwardly to permit the tilting of the shoe. By means of the roller 72 the sole is located, as shown in Fig. 5, so that the sole will be trimmed to produce the beveled edge D. By loosening the screws 50 the edge gage 8 may be adjusted vertically so that the knife 6 in addition to trimming the sole B will also cut a thin trimming from the edges of the welt C and first crepe sole layer or unit E.

The invention having been described, what I claim as new and desire to secure by Letters Patent of the United States is:

1. In a machine of the class described, in combination, a reciprocating trimming knife, and means for engaging the edge of a portion of a shoe bottom previously shaped substantially to final contour to locate relatively to the knife a portion of the shoe bottom to be trimmed and for rigidly supporting the portion of the shoe bottom to be trimmed against the thrust of the trimming knife.

2. In a machine of the class described, in combination, a reciprocating trimming knife, and a rigidly mounted work guide for engaging the edge of a portion of a shoe bottom previously shaped substantially to final contour to locate relatively to the knife a portion of the shoe bottom to be trimmed and for engaging the side of said portion to support the portion of the shoe bottom to be trimmed against the thrust of the trimming knife.

3. In a machine of the class described, in combination, a reciprocating trimming knife for operating upon the margin of a shoe bottom fed past the knife, means for engaging the edge of a portion of a shoe bottom previously shaped substantially to final contour to locate relatively to the knife a portion of the shoe bottom to be trimmed, and means offset from the path of the knife in the line of work feed for engaging the side of the shoe bottom adjacent to the upper to support the shoe bottom against the thrust of the trimming knife.

4. In a machine of the class described, in combination, a reciprocating trimming knife, means for engaging the edge of a portion of a shoe bottom previously shaped substantially to final contour to locate relatively to the knife a portion of the shoe bottom to be trimmed, and means offset from the path of the knife for engaging the side of the previously shaped portion of the shoe bottom to support the shoe bottom against the thrust of the knife.

5. In a machine of the class described, in combination, a reciprocating trimming knife, rigid means for engaging the edge of a portion of a shoe bottom previously shaped substantially to final contour to locate relatively to the knife a portion of the shoe bottom to be trimmed and for supporting the shoe bottom against the thrust of the knife in one direction, and means for supporting the shoe bottom against the thrust of the knife in the other direction.

6. In a machine of the class described, in combination, a reciprocating trimming knife, means for engaging the edge of a portion of a shoe bottom previously shaped substantially to final contour to locate relatively to the knife a portion of the shoe bottom to be trimmed and for supporting the shoe bottom against the thrust of the knife in one direction, and a roller for engaging the tread face of the shoe bottom only at a point adjacent to the plane of operation of the knife to support the shoe bottom against the thrust of the knife in the opposite direction.

7. In a machine of the class described, in combination, a reciprocating trimming knife, a rigid edge gage constructed and arranged to engage the previously trimmed edge of a welt on a shoe to position the sole of the shoe relatively to the trimming knife, and a bearing face on the gage for engaging the face of the welt and the projecting margin of the sole at the sides adjacent to the upper of the shoe.

8. In a machine of the class described, in combination, a reciprocating trimming knife having a lateral cutting edge, and an edge gage recessed to receive one end of the trimming knife and having a guiding surface for engaging the edge of a previously trimmed portion of the bottom of a shoe to locate an untrimmed portion of the shoe bottom relatively to the trimming knife.

9. In a machine of the class described, in combination, a reciprocating trimming knife having a lateral cutting edge, and an edge gage recessed to receive one end of the trimming knife and having a guiding surface in the plane of the cutting edge of the knife for engaging the edge of a previously trimmed portion of the bottom of a shoe to locate an untrimmed portion of the shoe bottom relatively to the trimming knife.

10. In a machine of the class described, in combination, a reciprocating trimming knife having a lateral cutting edge, an edge gage recessed to receive one end of the trimming knife and having a guiding surface for engaging the edge of a previously trimmed portion of the bottom of a shoe to locate an untrimmed portion of the shoe bottom relatively to the trimming knife, and a bearing face on the edge gage for the back of the trimming knife to support the knife against the thrust due to the feeding of the work.

11. In a machine for rounding the soles of welt shoes, in combination, a reciprocating trimming knife having a lateral cutting edge, an edge gage for engaging the edge of the welt to locate the sole relatively to the trimming knife, and means on the edge gage for engaging the exposed face of the welt in advance of the point of operation of the knife for supporting the shoe against the thrust of the knife.

12. In a machine for rounding the soles of welt shoes, in combination, a reciprocating trimming knife having a lateral cutting edge, an edge gage for engaging the edge of the welt to locate the sole relatively to the trimming knife, and means on the edge gage for engaging the exposed face of the welt beyond the point of operation of the knife for supporting the shoe against the thrust of the knife.

13. In a machine for rounding the soles of shoes, in combination, a reciprocating trimming knife, a sole edge gage for locating the sole of a shoe relatively to the knife as the sole is being fed past the knife, and a back rest comprising a roller across which the sole may be fed, said roller having its axis disposed at an acute angle to the path of the knife for positioning the sole for the trimming of a beveled edge.

14. In a machine of the class described, in combination, a reciprocating trimming knife, an edge gage for locating the bottom of a shoe relatively to the knife, a roller for engaging the marginal portion of the tread face of the sole, and a second roller for engaging the tread face at a point removed from the margin, the second roller being mounted with its axis inclined relatively to the plane of the knife and the first roller being mounted for tilting adjustment to accommodate changes in the position of the sole of the shoe.

15. In a machine of the class described, in combination, a trimming knife, an edge guide for the bottom of a shoe, a back rest having a roller mounted thereon for tilting adjustment to permit the shoe to be positioned with the sole at different angles with respect to the knife, and yielding means tending to maintain the roller with its axis perpendicular to the path of the knife.

In testimony whereof I have signed my name to this specification.

JACOB MARCUS.